United States Patent
Kim et al.

(10) Patent No.: US 11,427,658 B2
(45) Date of Patent: Aug. 30, 2022

(54) METHOD FOR MANUFACTURING LOW MOLECULAR WEIGHT ACRYLIC RESIN

(71) Applicant: LG Chem, Ltd., Seoul (KR)

(72) Inventors: Woo Yeon Kim, Daejeon (KR); Jun Man Choi, Daejeon (KR); Jang Soon Kim, Daejeon (KR); Kwang Su Seo, Daejeon (KR)

(73) Assignee: LG Chem, Ltd.

( * ) Notice: Subject to any disclaimer, the term of this patent is extended or adjusted under 35 U.S.C. 154(b) by 131 days.

(21) Appl. No.: 16/961,055

(22) PCT Filed: Jan. 11, 2019

(86) PCT No.: PCT/KR2019/000441
§ 371 (c)(1),
(2) Date: Jul. 9, 2020

(87) PCT Pub. No.: WO2019/139396
PCT Pub. Date: Jul. 18, 2019

(65) Prior Publication Data
US 2020/0347160 A1 Nov. 5, 2020

(30) Foreign Application Priority Data
Jan. 11, 2018 (KR) .................. 10-2018-0004026

(51) Int. Cl.
*C08F 2/01* (2006.01)
*C08F 2/02* (2006.01)
(Continued)

(52) U.S. Cl.
CPC ............ *C08F 20/18* (2013.01); *C08F 2/01* (2013.01); *C08F 2/02* (2013.01); *C08F 20/14* (2013.01); *C08F 20/16* (2013.01); *C08F 2500/02* (2013.01)

(58) Field of Classification Search
None
See application file for complete search history.

(56) References Cited

U.S. PATENT DOCUMENTS

| 4,487,897 A | 12/1984 | Matsuoka et al. |
| 4,619,979 A | 10/1986 | Kotnour et al. |
| (Continued) | | |

FOREIGN PATENT DOCUMENTS

| CN | 101005890 A | 7/2007 |
| CN | 1970584 B | 5/2010 |
| (Continued) | | |

OTHER PUBLICATIONS

International Search for Application No. PCT/KR2019/000441 dated Apr. 17, 2019, 2 pages.
(Continued)

*Primary Examiner* — Richard A Huhn
(74) *Attorney, Agent, or Firm* — Lerner, David, Littenberg, Krumholz & Mentlik, LLP (57) ABSTRACT

A method for manufacturing a low molecular weight acrylic resin, and more particularly, to a method for manufacturing a low molecular weight acrylic resin having a high conversion rate and a low poly dispersion index includes maintaining the temperature of a reacting part with a screw stirrer at a specific temperature during a continuous polymerization of a solvent-free acrylic composition in a continuous flow reactor having the reacting part.

11 Claims, 1 Drawing Sheet

(51) Int. Cl.
    *C08F 20/10*    (2006.01)
    *C08F 20/18*    (2006.01)
    *C08F 20/14*    (2006.01)
    *C08F 20/16*    (2006.01)

(56) References Cited

U.S. PATENT DOCUMENTS

| | | |
|---|---|---|
| 4,843,134 A | 6/1989 | Kotnour et al. |
| 5,847,021 A | 12/1998 | Tortorello et al. |
| 5,905,111 A | 5/1999 | Leugs et al. |
| 6,362,296 B1 | 3/2002 | Singhal et al. |
| 2002/0082375 A1 | 6/2002 | Andrist et al. |
| 2006/0036047 A1 | 2/2006 | Klostermann et al. |
| 2006/0287443 A1 | 12/2006 | Konig et al. |
| 2013/0345476 A1 | 12/2013 | Reese |

FOREIGN PATENT DOCUMENTS

| | | | |
|---|---|---|---|
| JP | S58053901 A | | 3/1983 |
| JP | S60219203 A | | 11/1985 |
| JP | H0732410 A | | 2/1995 |
| JP | H07126307 A | | 5/1995 |
| JP | 07233203 A | * | 9/1995 ............. C08F 20/12 |
| JP | H07233203 A | | 9/1995 |
| JP | H07324102 A | | 12/1995 |
| JP | H08269109 A | | 10/1996 |
| JP | H09052922 A | | 2/1997 |
| JP | H10087712 A | | 4/1998 |
| JP | 2929746 B2 | | 8/1999 |
| JP | 2001521948 A | | 11/2001 |
| JP | 2002307472 A | | 10/2002 |
| JP | 3706744 B2 | | 10/2005 |
| JP | 3878282 B2 | | 2/2007 |
| JP | 2007503519 A | | 2/2007 |
| JP | 2009215367 A | | 9/2009 |
| JP | 4724672 B2 | | 7/2011 |
| JP | 5002263 B2 | | 8/2012 |
| JP | 2013189545 A | | 9/2013 |
| JP | 2017178975 A | | 10/2017 |
| KR | 19990067326 A | | 8/1999 |
| KR | 20010024577 A | | 3/2001 |
| KR | 20110138635 A | | 12/2011 |
| KR | 101272849 B1 | | 6/2013 |
| KR | 20130066083 A | | 6/2013 |
| KR | 20150039713 A | | 4/2015 |
| KR | 20160038197 A | | 4/2016 |
| TW | I237642 B | | 8/2005 |
| WO | 2016031849 A1 | | 3/2016 |

OTHER PUBLICATIONS

Taiwan Search Report for Application No. 108101189, dated May 20, 2020, 1 page.

Extended European Search Report including Written Opinion for Application No. EP19738979 dated Jan. 25, 2021, 8 pgs.

* cited by examiner

METHOD FOR MANUFACTURING LOW MOLECULAR WEIGHT ACRYLIC RESIN

CROSS-REFERENCE TO RELATED APPLICATIONS

The present specification is a national phase entry under 35 U.S.C. § 371 of International Application No. PCT/KR2019/000441, filed Jan. 11, 2019, which claims priority to Korean Patent Application No. 10-2018-0004026, Jan. 11, 2018, the disclosures of which are incorporated herein by reference.

TECHNICAL FIELD

The present invention relates to a method for manufacturing a low molecular weight acrylic resin. Specifically, the present invention relates to a method for manufacturing a low molecular weight acrylic resin by continuously polymerizing a solvent-free acrylic composition.

BACKGROUND ART

Various optical members may be attached to a display device by adhesive films. The adhesive film needs to maintain adhesive properties for a long period of time even though the display device is exposed to the external environment. Thus, studies for improving adhesive properties of the adhesive film, specifically, adhesive durability have been actively conducted. In particular, during the manufacture of the adhesive film, a method of securing adhesive properties of the adhesive film by including a low molecular weight acrylic resin has been in the limelight.

In the related art, methods of manufacturing a low molecular weight acrylic resin using a solution including an acrylic monomer, a reaction solvent, a chain extender, and the like by using a batch reactor have been used.

However, the method of using a batch reactor has a problem in that defects of an adhesive film are caused by using an acrylic resin manufactured in a state where a reaction solvent and a chain extender remain. Furthermore, the method of using a batch reactor involves problems with safety such as decomposition or explosion of reactants due to the heat generation problem during the polymerization process.

Thus, there is a need for studies on a method for manufacturing an acrylic resin capable of solving the above-described problems by replacing the method of using a batch reactor.

PRIOR ART DOCUMENT

Patent Document

Japanese Patent Application Laid-Open No. JP 2001-521948 A

DETAILED DESCRIPTION OF INVENTION

Technical Problem

The present invention relates to a method for manufacturing a low molecular weight acrylic resin by continuously polymerizing a solvent-free acrylic composition in a continuous flow reactor.

However, a problem to be solved by the present invention is not limited to the aforementioned problem, and other problems that are not mentioned may be clearly understood by a person skilled in the art from the following description.

Technical Solution

An exemplary embodiment of the present invention provides a method for manufacturing a low molecular weight acrylic resin by continuously polymerizing a solvent-free acrylic composition including one or more (meth)acrylate-based monomers and a thermal initiator in a continuous flow reactor comprising a reacting part with a screw stirrer, a feeding part, and a discharging part, the method including: feeding the solvent-free acrylic composition to the reacting part through the feeding part; forming a low molecular weight acrylic resin having a weight average molecular weight of 20,000 g/mol to 150,000 g/mol by maintaining the temperature of the reacting part at 70° C. to 150° C. and continuously polymerizing the composition; and discharging the low molecular weight acrylic resin through the discharging part.

Advantageous Effects

A method for manufacturing a low molecular weight acrylic resin according to an exemplary embodiment of the present invention may prevent a phenomenon in which the quality of the low molecular weight acrylic resin deteriorates due to the remaining solvent by using a solvent-free acrylic composition.

The method for manufacturing a low molecular weight acrylic resin according to an exemplary embodiment of the present invention has an advantage in that the low molecular weight acrylic resin formed may be easily discharged by minimizing the amount of remaining reactant in a reactor.

The method for manufacturing a low molecular weight acrylic resin according to an exemplary embodiment of the present invention may prevent a problem in that the acrylic resin is changed over time according to the use of a molecular weight regulator because a separate molecular weight regulator is not used.

The method for manufacturing a low molecular weight acrylic resin according to an exemplary embodiment of the present invention has an advantage in that a low molecular weight acrylic resin may be stably manufactured because a continuous polymerization reactor is used.

BEST MODE

When one part "includes" one constituent element in the present specification, unless otherwise specifically described, this does not mean that another constituent element is excluded, but means that another constituent element may be further included.

In the present specification, the unit "parts by weight" means a ratio of the weights between the respective components.

In the present specification, "A and/or B" means "A and B, or A or B".

In the present specification, the term "monomer" may mean a material capable of additionally forming covalent bonds by using a series of the same or different molecules under polymer forming reaction conditions.

In the present specification, the term "(meth)acrylate" means "methacrylate" or "acrylate".

In the present specification, "a weight average molecular weight" of a compound may be calculated by using a molecular weight and a molecular weight distribution of the compound. Specifically, a sample specimen in which a concentration of a compound is 1 wt % is prepared by putting tetrahydrofuran (THF) and the compound into a 1-ml glass bottle, a standard specimen (polystyrene) and the sample specimen are filtered through a filter (pore size of 0.45 mm), and then the elution time of the sample specimen is compared with the calibration curve of the standard specimen by injecting the specimens into a GPC injector, thereby obtaining the molecular weight and the molecular weight distribution of the compound. In this case, Infinity II 1260 (manufactured by Agilent Inc.) may be used as a measuring apparatus, and the flow rate and the column temperature may be set to 1.00 mL/min and 40.0° C., respectively.

In the present specification, the term "poly dispersion Index (PDI)" is a ratio of a weight average molecular weight and a number average molecular weight, which are values converted in terms of polystyrene as measured by GPC, and means a value obtained by dividing the weight average molecular weight by the number average molecular weight.

In the present specification, the term "alkyl group" means a functional group including hydrocarbons bonded in a chain and/or branched form, and specifically, means a functional group including hydrocarbons having 1 to 20 carbon atoms and bonded in a chain and/or branched form. In the present specification, the term "cycloalkyl group" may mean a functional group including hydrocarbons bonded in a cyclic form, specifically, may mean a functional group including hydrocarbons having 3 to 20 carbon atoms and bonded in a cyclic form, and more specifically, may mean a functional group including a carbon ring structure in which no unsaturated bond is present in the functional group and including a monocyclic ring or polycyclic ring having 3 to 20 carbon atoms.

In the present specification, the term "separation distance between adjacent stirring blades" means a pitch of a stirring blade, and specifically, means the shortest distance from one end of one stirring blade to one end of the other stirring blade provided adjacent to the stirring blade.

In the present specification, the term "shortest distance from a distal end to a stirring axis in the screw stirrer" means a length of a perpendicular line from a virtual line of a distal end of a stirring axis, which is parallel to the stirring axis, to the surface of the stirring axis.

In the present specification, the term "length of a reacting part" means the longest distance from one end of the reacting part to the other end thereof in an axial direction. Further, the term "diameter of a reacting part" means the longest distance from one end of the reacting part to the other end thereof in a radius direction.

In the present specification, the term "continuous polymerization" may mean that the monomer in the above-described continuous flow reactor is polymerized according to the continuous flow of fluid.

An exemplary embodiment of the present invention provides a method for manufacturing a low molecular weight acrylic resin by continuously polymerizing a solvent-free acrylic composition including one or more (meth)acrylate-based monomers and a thermal initiator in a continuous flow reactor comprising a reacting part with a screw stirrer, a feeding part, and a discharging part, the method including: feeding the solvent-free acrylic composition to the reacting part through the feeding part; forming a low molecular weight acrylic resin having a weight average molecular weight of 20,000 g/mol to 150,000 g/mol by maintaining the temperature of the reacting part at 70° C. to 150° C. and continuously polymerizing the composition; and discharging the low molecular weight acrylic resin through the discharging part.

Figure 1:
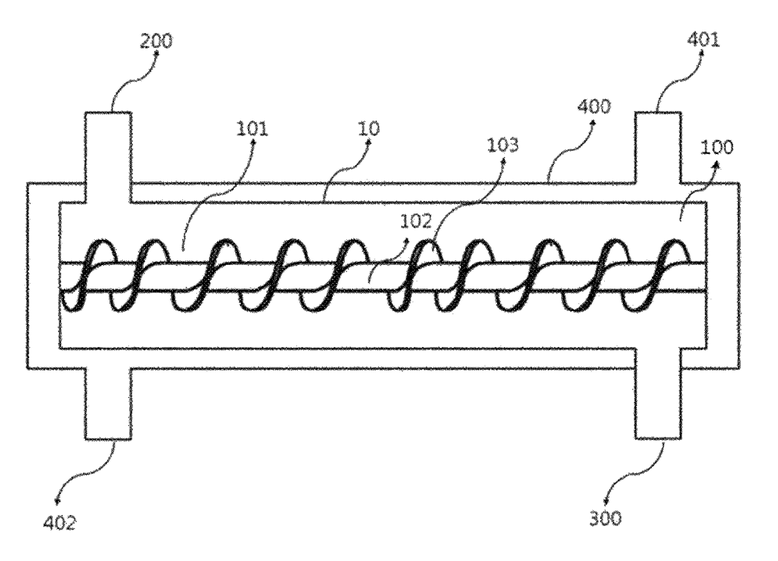
Figure is a view illustrating the cross-section of a continuous flow reactor used in a manufacturing method according to an exemplary embodiment of the present invention.

Hereinafter, a method for manufacturing a low molecular weight acrylic resin according to an exemplary embodiment of the present invention will be described in detail with reference to Figure.

Figure is a view illustrating the cross-section of a continuous flow reactor used in a manufacturing method according to an exemplary embodiment of the present invention.

A continuous flow reactor 10 used in the manufacturing method according to an exemplary embodiment of the present invention comprises a reacting part 100, a feeding part 200, and a discharging part 300, and the reacting part, the feeding part, and the discharging part may be continuously connected to one another. Further, the reacting part 100 includes a screw stirrer 101, and the screw stirrer 101 may include a stirring axis 102 connected from one end of the reacting part to the other end thereof, and a plurality of stirring blades 103 provided along the perimeter of the stirring axis. The plurality of stirring blades may be provided to be spaced apart from one another, and may be provided in a form of being wound around the stirring axis. Moreover, the continuous flow reactor 10 may be provided in a thermostat 400. Further, the temperature of the reacting part 100 may be adjusted according to the temperature of a heat medium which is fed through a heat medium feeding part 401 of the thermostat and is discharged along a heat medium discharging part 402 thereof. That is, the temperature of the reacting part 100 may be maintained within a predetermined range by feeding a heat medium having the temperature within a predetermined range to the heat medium feeding part 401 and discharging the fed heat medium through the heat medium discharging part 402. Meanwhile, the heat medium may mean a fluid used as a medium of transporting heat in the related art, and may be selected freely among publicly known materials as long as the heat medium may be used in order to maintain the temperature range of the reacting part 100 to be described below.

According to an exemplary embodiment of the present specification, the end of the stirring blade may be spaced apart from an inner wall of the reacting part, and specifically, the end of the stirring blade may not be brought into contact with the inner wall of the reacting part. Accordingly, it is possible to prevent a problem in that the inner wall of the reacting part is damaged by the stirring blades during the stirring of the screw stirrer.

According to an exemplary embodiment of the present invention, the continuous flow reactor may be formed of steel use stainless (SUS). Accordingly, heat energy supplied through an external heat medium may be transferred to the continuous flow reactor with high efficiency.

An exemplary embodiment of the present invention includes feeding a solvent-free acrylic composition to the reacting part 100 through the feeding part 200.

According to an exemplary embodiment of the present invention, in the feeding of the solvent-free acrylic composition to the reacting part, the solvent-free acrylic composition may be fed at a feed flow rate of 30 mL/min to 200 mL/min. When the feed flow rate of the solvent-free acrylic composition is within the above range, a continuous polymerization reaction from the solvent-free acrylic composition to the low molecular weight acrylic resin may smoothly occur.

Further, according to an exemplary embodiment of the present invention, the fluid behavior of the solvent-free acrylic composition fed to the continuous flow reactor may be a turbulent flow. That is, a composition of a component included in the solvent-free acrylic composition may not vary depending on the radial direction of the continuous flow reactor, and may vary depending on the axial direction of the continuous flow reactor.

According to an exemplary embodiment of the present invention, the solvent-free acrylic composition includes one or more (meth)acrylate-based monomers and a thermal initiator.

According to an exemplary embodiment of the present invention, the (meth)acrylate-based monomer may include at least one of an alkyl group-containing (meth)acrylate-based monomer, a cycloalkyl group-containing (meth)acrylate-based monomer, and a polar functional group-containing (meth)acrylate-based monomer. That is, the low molecular weight acrylic resin may be manufactured by polymerizing at least one of the acrylic monomers.

According to an exemplary embodiment of the present invention, the alkyl group-containing (meth)acrylate-based monomer may be a (meth)acrylate-based monomer in which the alkyl group is bonded to a (meth)acrylate-based monomer. In addition, the cycloalkyl group-containing (meth)acrylate-based monomer may be a (meth)acrylate-based monomer in which the cycloalkyl group is bonded to a (meth)acrylate-based monomer. Furthermore, the polar functional group-containing (meth)acrylate-based monomer may be a (meth)acrylate-based monomer in which a polar functional group is bonded to a (meth)acrylate-based monomer.

According to an exemplary embodiment of the present invention, the alkyl group-containing (meth)acrylate-based monomer may include at least one of methacrylate, methyl (meth)acrylate, ethyl(meth)acrylate, n-propyl(meth)acrylate, isopropyl(meth)acrylate, n-butyl(meth)acrylate, t-butyl (meth)acrylate, sec-butyl(meth)acrylate, pentyl(meth) acrylate, 2-ethylhexyl(meth)acrylate, 2-ethylbutyl(meth) acrylate, n-octyl(meth)acrylate, and isooctyl(meth)acrylate.

According to an exemplary embodiment of the present invention, the cycloalkyl group-containing (meth)acrylate-based monomer may include at least one of cyclohexyl acrylate (CHA), cyclohexyl methacrylate (CHMA), isobornyl acrylate (IBOA), isobornyl methacrylate (IBOMA), isobornyl methyl (meth)acrylate, and 3,3,5-trimethylcyclohexylacrylate (TMCHA).

According to an exemplary embodiment of the present invention, the polar functional group-containing (meth)acrylate-based monomer may include at least one of a hydroxyl group-containing (meth)acrylate-based monomer, a carboxyl group-containing (meth)acrylate-based monomer, and a nitrogen-containing (meth)acrylate-based monomer.

Specifically, the hydroxyl group-containing (meth)acrylate-based monomer may include at least one of 2-hydroxyethyl (meth)acrylate, 2-hydroxypropyl (meth)acrylate, 4-hydroxybutyl (meth)acrylate, 6-hydroxyhexyl (meth)acrylate, 8-hydroxyoctyl (meth)acrylate, 2-hydroxyethylene glycol (meth)acrylate, and 2-hydroxypropylene glycol (meth)acrylate.

Further, the carboxyl group-containing (meth)acrylate-based monomer may include at least one of acrylic acid, methacrylic acid, 2-carboxyethyl acrylic acid, 3-carboxypropyl acrylic acid, 2-(meth)acryloyloxy acetic acid, 3-(meth)acryloyloxy propyl acid, 4-(meth)acryloyloxy butyl acid, and an acrylic acid dimer.

According to an exemplary embodiment of the present invention, the nitrogen-containing (meth)acrylate-based monomer may include at least one of 2-isocyanatoethyl (meth)acrylate, 3-isocyanatopropyl (meth)acrylate, 4-isocyanatobutyl (meth)acrylate, and (meth)acrylamide.

According to an exemplary embodiment of the present invention, the solvent-free acrylic composition may include a thermal initiator, thereby initiating a polymerization reaction of one or more (meth)acrylate-based monomers included in the solvent-free acrylic composition into a low molecular weight acrylic resin. The thermal initiator is an initiator that triggers the crosslinking by heating, and may include, for example, at least one selected from the group consisting of an azo-based thermal initiator and a peroxy-based thermal initiator.

According to an exemplary embodiment of the present invention, the azo-based thermal initiator may be 2,2'-azobis (2-methylbutyronitrile) [V-59, Wako Pure Chemical Industries, Ltd.], 2,2'-azobis(isobutyronitrile) [V-60, Wako Pure Chemical Industries, Ltd.], 2,2'-azobis(2,4-dimethylvaleronitrile) [V-65, Wako Pure Chemical Industries, Ltd.], 4,4-azobis(4-cyanovaleric acid), 1,1'-azobis(cyclohexanecarbonitrile), 2,2'-azobis(4-methoxy-2,4-dimethylvaleronitrile) [V-70, Wako Pure Chemical Industries, Ltd.], or the like.

According to an exemplary embodiment of the present invention, the thermal initiator may be included in a content of 0.1 part by weight to 1 part by weight with respect to 100 parts by weight of the (meth)acrylate-based monomer. Specifically, a content of the thermal initiator may be 0.2 part by weight to 1 part by weight, 0.2 part by weight to 0.7 part by weight, 0.2 part by weight to 0.5 part by weight, 0.5 part by weight to 0.7 part by weight, 0.3 part by weight to 0.7 part by weight, 0.3 part by weight to 0.5 part by weight, 0.3 part by weight to 1 part by weight, 0.7 part by weight to 1 part by weight, 0.5 part by weight to 1 part by weight, or 0.2 part by weight to 0.3 part by weight, with respect to 100 parts by weight of the (meth)acrylate-based monomer.

When the content of the thermal initiator is within the above range, the polymerization reaction of the (meth) acrylate-based monomer may be initiated, and the weight average molecular weight range of the acrylic resin may be secured by preventing the overpolymerization.

According to an exemplary embodiment of the present invention, the solvent-free acrylic composition means that a separate solvent required for the polymerization reaction is not included. That is, the low molecular weight acrylic resin may be manufactured by bulk polymerization of the solvent-free acrylic composition instead of solution polymerization of the solvent-free acrylic composition. The solvent is a solvent required for a polymerization reaction, and may mean a publicly-known solvent that may be used in order to manufacture an acrylic resin in the art. The acrylic composition may not include a separate solvent, thereby preventing the quality of a low molecular weight acrylic resin from deteriorating due to the remaining solvent.

According to an exemplary embodiment of the present invention, the solvent-free acrylic composition may not include any molecular weight regulator. Meanwhile, the molecular weight regulator may mean a material that increases or decreases the molecular weight of a polymerization product without affecting the polymerization rate. When the solvent-free acrylic composition does not include any molecular weight regulator, it is possible to prevent a problem in that an acrylic resin is changed over time.

A method for manufacturing a low molecular weight acrylic resin according to an exemplary embodiment of the present invention has an advantage in that it is possible to solve a problem in that an acrylic resin is cured (gelled), a problem in that it is difficult to handle the low molecular weight acrylic resin during the process, and a problem in that the polymerization conversion rate is decreased as the acrylic resin remains in the reactor, while using a solvent-free acrylic composition which does not include any molecular weight regulator. The fact that a molecular weight regulator is not substantially included may mean a case where the molecular weight regulator is included in an amount of less than 1 ppm.

Since the solvent-free acrylic composition according to an exemplary embodiment of the present invention does not include any molecular weight regulator, the low molecular weight acrylic resin may not include a residue derived from the molecular weight regulator.

An exemplary embodiment of the present invention includes forming a low molecular weight acrylic resin having a weight average molecular weight of 20,000 g/mol to 150,000 g/mol by maintaining the temperature of the reacting part 100 at 70° C. to 150° C. and continuously polymerizing the composition.

According to an exemplary embodiment of the present invention, the forming of the low molecular weight acrylic resin is performed while maintaining the temperature of the reacting part at 70° C. to 150° C. Specifically, the forming of the low molecular weight acrylic resin may be performed while maintaining the temperature of the reacting part at 70° C. to 130° C., 70° C. to 120° C., 80° C. to 150° C., 80° C. to 130° C., 80° C. to 120° C., 90° C. to 150° C., 90° C. to 130° C., or 90° C. to 120° C. When the temperature of the reacting part is within the above range, the continuous polymerization of the solvent-free acrylic composition into a low molecular weight acrylic resin may be smoothly performed.

Specifically, when the temperature of the reacting part is less than the above range, there may occur a problem in that the amount of solvent-free acrylic composition remaining in the reacting part is increased. Further, when the temperature of the reacting part is more than the above range, there may occur a problem in that the solvent-free acrylic composition is overpolymerized, and as a result, the acrylic resin remains in a cured state in the reacting part, and there may occur a problem in that the reacting part is exploded due to the increase in temperature of the reacting part.

According to an exemplary embodiment of the present invention, a ratio of the length to the diameter of the reacting part may be 14:1 to 28:1. When the ratio of the length to the diameter of the reacting part is within the above range, the temperature in the reacting part may be easily controlled, and the fed solvent-free acrylic composition may not remain in the reacting part. Accordingly, the solvent-free acrylic composition may be sufficiently polymerized into the low molecular weight acrylic resin.

According to an exemplary embodiment of the present invention, as the stirring axis 102 of the screw stirrer 101 included in the reacting part 100 is rotated, a plurality of stirring blades included in the screw stirrer is rotated, so that the solvent-free acrylic composition fed to the reacting part may be mixed, and accordingly, the low molecular weight acrylic resin may be continuously polymerized.

According to an exemplary embodiment of the present invention, a separation distance between adjacent stirring blades of the screw stirrer (hereinafter, a pitch of a stirring blade) may be 10 mm to 20 mm. In addition, according to an exemplary embodiment of the present invention, the shortest distance from a distal end of the stirring blade to the stirring axis in the screw stirrer may be 5 mm to 10 mm.

When the pitch of the stirring blade and the shortest distance from the distal end to the stirring axis in the screw stirrer satisfy the above ranges, a continuous polymerization reaction of the solvent-free acrylic composition into the low molecular weight acrylic resin may be smoothly performed. Specifically, it is possible to easily control heat generation of the continuous polymerization reaction of the solvent-free acrylic composition into the low molecular weight acrylic resin, and it is possible to allow a low molecular weight acrylic resin to be manufactured to have weight average molecular weight, conversion rate, and poly dispersion index ranges according to an exemplary embodiment of the present invention.

According to an exemplary embodiment of the present invention, the forming of the low molecular weight acrylic resin may be performed while maintaining the stirring rate of the screw stirrer at 50 rpm to 150 rpm. Meanwhile, the stirring rate means the number of rotations per time (unit: minute) of the stirring blade included in the screw stirrer. When the stirring rate is within the above range, a continuous polymerization into the low molecular weight acrylic resin may be smoothly performed, and the manufactured low molecular weight acrylic resin may be sufficiently discharged without being accumulated in the reactor.

According to an exemplary embodiment of the present invention, the forming of the low molecular weight acrylic resin may be performed for 1 hour to 2 hours. That is, a time for the continuous polymerization reaction from the solvent-free acrylic composition into the low molecular weight acrylic resin may be 1 hour to 2 hours. When the time for the continuous polymerization reaction is within the above range, it is possible to smoothly form the low molecular weight acrylic resin, to prevent a phenomenon in which the low molecular weight acrylic resin is cured (gelled) because heat generation of the low molecular weight acrylic resin is not controlled, and to secure the stability of the resulting continuous polymerization reaction.

According to an exemplary embodiment of the present invention, the forming of the low molecular weight acrylic resin may be performed while maintaining an internal pressure of the reacting part at 5 bar or less, specifically, more than 0 bar and 5 bar or less, 1 bar to 5 bar, 1.5 bar to 5 bar, 1.5 bar to 4.5 bar, 1.5 bar to 4 bar, 1.5 bar to 3 bar, or 1.5 bar to 2 bar. When the internal pressure of the reacting part is within the above range, the continuous polymerization reaction of the low molecular weight acrylic composition into the low molecular weight acrylic resin may be stably performed.

According to an exemplary embodiment of the present invention, the reacting part may be composed of a front end part and a rear end part. Meanwhile, in the present specification, the front end part means a part from one end of the reacting part in an axial direction to the middle point of the reacting part, and the rear end part means a part from the middle point of the reacting part to the other end of the reacting part in an axial direction.

According to an exemplary embodiment of the present invention, the forming of the low molecular weight acrylic resin may continuously polymerize the solvent-free acrylic composition while maintaining the temperatures of the front end part and the rear end part at the same temperature or different temperatures. Specifically, the forming of the low molecular weight acrylic resin may continuously polymerize the composition while maintaining the temperature of the front end part at 100° C. to 150° C., and maintaining the temperature of the rear end part at 70° C. to 110° C. When the front end part and the rear end part of the reacting part are maintained at a specific temperature, the continuous polymerization reaction of the low molecular weight acrylic composition into the low molecular weight acrylic resin may be stably performed. Meanwhile, the temperature of the front end part may be adjusted according to the temperature of a heat medium which is fed through a first heat medium feeding part of a first thermostat and is discharged along a first heat medium discharging part thereof, and the temperature of the rear end part may be adjusted according to the temperature of a heat medium which is fed through a second heat medium feeding part of a second thermostat and is discharged along a second heat medium discharging part thereof.

According to an exemplary embodiment of the present invention, the pitch of the stirring blade of each screw stirrer of the front end part and the rear end part and the shortest distance from the distal end of the stirring blade to the stirring axis in the screw stirrer may be the same as or different from each other. Specifically, the pitch of the stirring blade of each screw stirrer of the front end part and the rear end part may be independently 10 mm to 20 mm. In addition, the shortest distance from a distal end of the stirring blade of the front end part and the rear end part to the stirring axis in the screw stirrer may be independently 5 mm to 10 mm.

An exemplary embodiment of the present invention includes discharging the low molecular weight acrylic resin through the discharging part 300.

According to an exemplary embodiment of the present invention, the low molecular weight acrylic resin produced in the reacting part of the continuous flow reactor may be obtained by being discharged through the discharging part of the continuous flow reactor. Further, when the low molecular weight acrylic resin is not discharged, the formed low molecular weight acrylic resin may reside inside the continuous flow reactor. Accordingly, there may occur a problem in that the internal pressure of the continuous flow reactor is increased, and as a result, the polymerization stability of the low molecular weight acrylic resin deteriorates and the productivity of the low molecular weight acrylic resin is decreased.

According to an exemplary embodiment of the present invention, a flow rate at which the solvent-free acrylic composition is fed to the feeding part of the continuous flow reactor and a flow rate at which the low molecular weight acrylic resin is discharged from the discharging part of the continuous flow reactor may be the same as each other. That is, according to an exemplary embodiment of the present invention, the discharging of the low molecular weight acrylic resin may discharge the formed acrylic resin through the discharging part at a discharging flow rate of 30 mL/min to 200 mL/min.

Further, in this case, the continuous flow reactor may maintain a steady-state. That is, in the method for manufacturing a low molecular weight acrylic resin according to an exemplary embodiment of the present invention, the production rate of the low molecular weight acrylic resin may not be changed over time.

Hereinafter, a low molecular weight acrylic resin manufactured according to the manufacturing method will be described in more detail.

According to an exemplary embodiment of the present invention, the low molecular weight acrylic resin may include the (meth)acrylate-based monomer as a monomer unit. That is, the (meth)acrylate-based monomer may be included as a repeating unit in the low molecular weight acrylic resin during a process of forming the (meth)acrylate-based monomer as the low molecular weight acrylic resin.

According to an exemplary embodiment of the present invention, the acrylic resin may have a weight average molecular weight of 20,000 g/mol to 150,000 g/mol. Specifically, the acrylic resin may have a weight average molecular weight of 25,000 g/mol to 150,000 g/mol, 25,000 g/mol to 130,000 g/mol, 35,000 g/mol to 130,000 g/mol, 45,000 g/mol to 150,000 g/mol, 45,000 g/mol to 130,000 g/mol, 25,000 g/mol to 35,000 g/mol, or 25,000 g/mol to 34,000 g/mol. Since the low molecular weight acrylic resin has a weight average molecular weight within the above range, when the low molecular weight acrylic resin is included in an adhesive composition, excellent attachment strength may be exhibited, and the low molecular weight acrylic resin may be applied to various optical materials.

According to an exemplary embodiment of the present invention, a poly dispersion index of the low molecular weight acrylic resin may be 5 or less, specifically, 2 to 5, 2 to 3.5, 2.5 to 5, 2.5 to 3.5, 2.9 to 3.3, or 2.9 to 3.1. The fact that the low molecular weight acrylic resin has a poly dispersion index within the above-described range may mean that heat is uniformly transferred during a continuous polymerization process into the low molecular weight acrylic resin.

According to an exemplary embodiment of the present invention, a conversion rate of the low molecular weight acrylic resin measured according to the following General Equation 1 may be 70% to 99%, specifically, 70% to 90%, and more specifically, 70% to 80%, 70% to 79%, 71% to 79%, 83.5% to 85%, or 84% to 85%.

$$C = B/A \times 100\% \qquad \text{[General Equation 1]}$$

In General Equation 1, A means a weight (g) of a low molecular weight acrylic resin, B means a weight (g) of a dried low molecular weight acrylic resin, and C means a conversion rate (%).

According to an exemplary embodiment of the present invention, the dried low molecular weight acrylic resin may be obtained by drying the low molecular weight acrylic resin at a temperature of about 150° C. for a period of time of about 50 minutes.

The fact that the low molecular weight acrylic resin has a conversion rate within the above-described range may mean that the fed solvent-free acrylic composition rarely remains in the reacting part, and most of the solvent-free acrylic composition is continuously polymerized into a low molecular weight acrylic resin.

Another exemplary embodiment of the present invention provides a low molecular weight acrylic resin manufactured according to the manufacturing method.

According to an exemplary embodiment of the present invention, the low molecular weight acrylic resin may be the same as the above-described low molecular weight acrylic resin.

MODE FOR INVENTION

Hereinafter, the present invention will be described in detail with reference to Examples for specifically describing the present invention. However, the Examples according to the present invention may be modified in various forms, and it is not interpreted that the scope of the present invention is limited to the Examples to be described below. The Examples of the present specification are provided for more completely explaining the present invention to the person with ordinary skill in the art.

Example 1

A continuous flow reactor comprising a reacting part composed of a front end part (length: 500 mm) with a screw stirrer and a rear end part (length: 500 mm) with a screw stirrer, a feeding part provided on one end of the reacting part, and a discharging part provided on the other end of the reacting part was prepared. A pitch of a stirring blade of the front end part screw stirrer was 10 mm, and the shortest distance from a distal end of the stirring blade to a stirring axis was 5 mm. Moreover, a pitch of a stirring blade of the rear end part screw stirrer was 20 mm, and the shortest distance from a distal end of the stirring blade to the stirring axis was 10 mm.

The continuous flow reactor was disposed, such that the front end part of the continuous flow reactor was disposed in a first thermostat including a first heat medium feeding part and a first heat medium discharging part and the rear end part of the continuous flow reactor was disposed in a second thermostat including a second heat medium feeding part and a second heat medium discharging part.

A solvent-free acrylic composition including 0.2 part by weight of an azo-based thermal initiator [2,2'-azobis(2,4-dimethylvaleronitrile); V-65, Wako Pure Chemical Industries, Ltd.] with respect to 100 parts by weight of a total of 52 parts by weight of 2-ethylhexyl acrylate (2-EHA), 38 parts by weight of isobornyl acrylate (IBOA), and parts by weight of hydroxyethyl acrylate (HEA) was prepared.

The temperature of the front end part was maintained at 105° C. by circulating silicone oil as a heat medium through the first heat medium feeding part and the first heat medium discharging part of the first thermostat. Further, the temperature of the rear end part was maintained at 105° C. by circulating silicone oil as a heat medium through the second heat medium feeding part and the second heat medium discharging part of the second thermostat.

Next, through the feeding part of the continuous flow reactor, the solvent-free acrylic composition was fed to the reacting part at a flow rate of 200 mL/min.

A low molecular weight acrylic resin was formed by adjusting the stirring rate of the screw stirrer in the reacting part to 50 rpm to 150 rpm and performing a bulk continuous polymerization for 1 hour. Next, a low molecular weight acrylic resin was manufactured by discharging the formed low molecular weight acrylic resin at the same flow rate as the feeding flow rate through the discharging part of the continuous flow reactor.

Example 2

A low molecular weight acrylic resin was manufactured in the same manner as in Example 1, except that the content of the thermal initiator was adjusted to 0.5 part by weight and the bulk continuous polymerization was performed for 1 hour and 5 minutes.

Example 3

A low molecular weight acrylic resin was manufactured in the same manner as in Example 1, except that the content of the thermal initiator was adjusted to 1 part by weight and the bulk continuous polymerization was performed for 1 hour and 15 minutes.

Example 4

A low molecular weight acrylic resin was manufactured in the same manner as in Example 1, except that the content of the thermal initiator was adjusted to 0.3 part by weight.

Example 5

A low molecular weight acrylic resin was manufactured in the same manner as in Example 1, except that the content of the thermal initiator was adjusted to 0.5 part by weight, the pitch of the stirring blade of the rear end part was 10 mm, the shortest distance from the distal end of the stirring blade to the stirring axis was 5 mm, and the bulk continuous polymerization was performed for 1 hour and 20 minutes.

Example 6

A low molecular weight acrylic resin was manufactured in the same manner as in Example 5, except that the temperature of the rear end part was maintained at 70° C. by circulating silicone oil as a heat medium through the second heat medium feeding part and the second heat medium discharging part of the second thermostat, and the bulk continuous polymerization was performed for 2 hours.

Example 7

A low molecular weight acrylic resin was manufactured in the same manner as in Example 6, except that the content of the thermal initiator was adjusted to 0.7 part by weight.

Comparative Example 1

52 parts by weight of 2-ethylhexyl acrylate (2-EHA), 38 parts by weight of isobornyl acrylate (IBOA), and 10 parts by weight of hydroxyethyl acrylate (HEA) were introduced into a batch glass reactor, the air in the reactor was removed by introducing nitrogen into the reactor for 1 hour, and then the reactor temperature was increased by using a water circulation heater. Moreover, when the reactor temperature reached 40° C. to 80° C., a polymerization reaction in the batch glass reactor was induced by introducing 0.2 part by weight of an azo-based thermal initiator [2,2'-azobis(4-methoxy-2,4-dimethylvaleronitrile); V-70, Wako Pure Chemical Industries, Ltd.] with respect to 100 parts by weight of a total of 2-ethylhexyl acrylate (2-EHA), isobornyl acrylate (IBOA), and hydroxyethyl acrylate (HEA).

However, in this case, since the temperature of the reactor was more than 140° C., the polymerization reaction was forcibly terminated and the low molecular weight acrylic resin could not be obtained.

Comparative Example 2

A continuous flow reactor comprising a reacting part having no separate screw stirrer, a feeding part provided at one end of the reacting part, and a discharging part provided on the other end of the reacting part was prepared.

The continuous flow reactor was disposed in a thermostat including a heat medium feeding part and a heat medium discharging part.

A solvent-free acrylic composition including 0.2 part by weight of an azo-based thermal initiator [2,2'-azobis(4-methoxy-2,4-dimethylvaleronitrile); V-70, Wako Pure Chemical Industries, Ltd.] with respect to 100 parts by weight of a total of 52 parts by weight of 2-ethylhexyl acrylate (2-EHA), 38 parts by weight of isobornyl acrylate (IBOA), and 10 parts by weight of hydroxyethyl acrylate (HEA) was prepared.

Through the heat medium feeding part and discharging part of the thermostat, a heat medium at 105° C. was circulated. Next, through the feeding part of the continuous flow reactor, the solvent-free acrylic composition was fed to the reacting part.

The temperature of the reacting part was maintained at 105° C., and a low molecular weight acrylic resin was formed. Next, the low molecular weight acrylic resin was manufactured by discharging the low molecular weight acrylic resin through the discharging part of the continuous flow reactor.

Comparative Example 3

A solvent-type acrylic composition including 0.06 part by weight of a photopolymerization initiator (Irgacure 184, CIBA), 0.12 part by weight of a molecular weight regulator (isooctyl-thioglycolate), and 30 parts by weight of an ethyl acetate solvent, with respect to 100 parts by weight of a total of 52 parts by weight of 2-ethylhexyl acrylate (2-EHA), 38 parts by weight of isobornyl acrylate (IBOA), and 10 parts by weight of hydroxyethyl acrylate (HEA) was prepared.

A low molecular weight acrylic resin was manufactured by introducing the solvent-type acrylic composition into a batch glass reactor and irradiating the composition with light for 5 hours using a metal halide lamp.

Comparative Example 4

52 parts by weight of 2-ethylhexyl acrylate (2-EHA), 38 parts by weight of isobornyl acrylate (IBOA), and 10 parts by weight of hydroxyethyl acrylate (HEA) were introduced into a batch glass reactor, the air in the reactor was removed by introducing nitrogen into the reactor for 1 hour, and then the reactor temperature was increased by using a water circulation heater. Moreover, when the reactor temperature reached 40° C. to 80° C., a low molecular weight acrylic resin was manufactured by introducing 0.002 part by weight of an azo-based thermal initiator [2,2'-azobis(4-methoxy-2, 4-dimethylvaleronitrile); V-70, Wako Pure Chemical Industries, Ltd.] and 0.12 part by weight of a molecular weight regulator (dodecyl mercaptan), with respect to 100 parts by weight of a total of 2-ethylhexyl acrylate (2-EHA), isobornyl acrylate (IBOA), and hydroxyethyl acrylate (HEA) to induce a polymerization reaction in the batch glass reactor.

[Experimental Example 1]—Measurement of Weight Average Molecular Weight and Poly Dispersion Index A sample in which the concentration of the low molecular weight acrylic resin was 1 wt % was manufactured by dissolving each of the low molecular weight acrylic resins according to Examples 1 to 7 and Comparative Examples 2 to 4 in a tetrahydrofuran solvent.

The weight average molecular weight and poly dispersion index of the sample were measured by using GPC (Agilent 1260), and are shown in the following Table 1.

[Experimental Example 2]—Measurement of Conversion Rate

A sample was manufactured by collecting 0.1 g (A) of each of the low molecular weight acrylic resins according to Examples 1 to 7 and Comparative Examples 2 to 4.

The weight (B) after drying the sample in an oven at 150° C. for 50 minutes was measured, and the conversion rate was calculated according to General Equation 1, and is shown in the following Table 1.

TABLE 1

| Classification | Weight average molecular weight (×10,000 g/mol) | Poly dispersion index (—) | Conversion rate (%) | Internal pressure of the reacting part (bar) |
|---|---|---|---|---|
| Example 1 | 13.0 | 3.3 | 70.16 | 5.0 |
| Example 2 | 6.0 | 2.8 | 71.12 | 4.0 |
| Example 3 | 4.6 | 2.7 | 78.56 | 4.0 |
| Example 4 | 8.0 | 4.0 | 71.00 | 4.5 |
| Example 5 | 3.5 | 3.3 | 83.50 | 3.0 |
| Example 6 | 3.4 | 3.1 | 85.00 | 2.0 |
| Example 7 | 2.5 | 2.9 | 84.00 | 1.5 |
| Comparative Example 1 | Reaction was forcibly terminated due to an increase in reaction temperature | | | |
| Comparative Example 2 | 6.3 | 3.0 | 64.56 | 10.0 |
| Comparative Example 3 | 3.0 | 2.5 | 95.00 | — |
| Comparative Example 4 | 4.0 | 3.5 | 40.00 | — |

According to Table 1, it could be confirmed that the methods for manufacturing a low molecular weight acrylic resin according to Examples 1 to 7 could manufacture low molecular weight acrylic resins having a weight average molecular weight of 20,000 g/mol to 150,000 g/mol with a high conversion rate. In particular, it could be confirmed that the low molecular weight acrylic resins according to Examples 6 and 7 in which the temperatures of the front end part and the rear end part were differently adjusted had a small weight average molecular weight and an excellent conversion rate.

Meanwhile, since the method according to Comparative Example 1 using a batch glass reactor increased the reactor temperature to 140° C. or more, the polymerization reaction was forcibly terminated due to the safety problem, and in this case, it could be confirmed that the low molecular weight acrylic resin could not be manufactured.

It could be confirmed that according to the manufacturing method in Comparative Example 2 using a continuous flow reactor which did not include a screw stirrer, a low molecular weight body could be manufactured, but the conversion rate of the manufactured low molecular weight acrylic resin was about 65%, and fell short within the range according to an exemplary embodiment of the present invention. In addition, it could be seen that the low molecular weight acrylic resin formed according to the polymerization method in Comparative Example 2 was not sufficiently discharged from the reacting part. Furthermore, there was a problem in that the polymerization method in Comparative Example 2 was inappropriate for being applied to a mass production process because the polymerization stability deteriorated and pressure was rapidly increased during a polymerization for a long period of time.

In the case of Comparative Example 3 in which a low molecular weight resin was manufactured by photopolymerizing a solvent-type acrylic composition including a molecular weight regulator in a batch glass reactor, there was a problem in that a separate process of removing the solvent and the molecular weight regulator was required. Moreover, in the case of Comparative Example 3, there was a problem in that Comparative Example 3 was inappropriate for being applied to a mass production process due to the long reaction time.

In the case of Comparative Example 4 in which a low molecular weight resin was manufactured by photopolymerizing a solvent-free acrylic composition including a molecular weight regulator in a batch glass reactor, there was a problem in that Comparative Example 4 had a low conversion rate because the reaction heat was not smoothly controlled.

In summary, it can be seen that the method for manufacturing a low molecular weight acrylic resin according to an exemplary embodiment of the present invention can stably manufacture a low molecular weight acrylic resin having a high conversion rate and a low poly dispersion index and having a weight average molecular weight of 20,000 g/mol to 150,000 g/mol even with a short reaction time. Furthermore, it can be seen that it is possible to prevent the deterioration in quality of a low molecular weight acrylic resin due to the remaining solvent because a solvent-free acrylic composition is used.

EXPLANATION OF REFERENCE NUMERALS AND SYMBOLS

10: Continuous flow reactor
100: Reacting part
101: Screw stirrer
102: Stirring axis
103: Stirring blade
200: Feeding part
300: Discharging part
400: Thermostat
401: Heat medium feeding part
402: Heat medium discharging part

The invention claimed is:

1. A method for manufacturing a low molecular weight acrylic resin by continuously polymerizing a solvent-free acrylic composition comprising one or more (meth)acrylate-based monomers and a thermal initiator in a continuous flow reactor, wherein the continuous flow reactor comprises a reacting part with a screw stirrer, a feeding part, and a discharging part, the method comprising:

feeding the solvent-free acrylic composition to the reacting part through the feeding part;

maintaining a temperature of the reacting part at 70° C. or more and 150° C. or less and continuously polymerizing the solvent-free acrylic composition to form forming a low molecular weight acrylic resin having a weight average molecular weight of 20,000 g/mol or more and 150,000 g/mol or less; and discharging the low molecular weight acrylic resin through the discharging part, wherein a separation distance adjacent stirring blades of the screw stirrer to 10 mm or more and 20 mm or less.

2. The method of claim 1, wherein the solvent-free acrylic composition is fed to the reacting part at a feeding flow rate of 30 mL/min or more and 200 mL/min or less.

3. The method of claim 1, wherein the thermal initiator is comprised in a content of 0.1 part by weight or more and 1 part by weight or less with respect to 100 parts by weight of the (meth)acrylate-based monomer.

4. The method of claim 1, wherein the solvent-free acrylic composition does not comprise a molecular weight regulator.

5. The method of claim 1, wherein a ratio of a length to a diameter of the reacting part is 14:1 to 28:1.

6. The method of claim 1, wherein a shortest distance from a distal end of a stirring blade to a stirring axis in the screw stirrer is 5 mm or more and 10 mm or less.

7. The method of claim 1, wherein in the maintaining the temperature of the reacting part, the reacting part is composed of a front end part and a rear end part, and the temperature of the front end part is maintained at 100° C. or more and 150° C. or less, and the temperature of the rear end part is maintained at 70° C. or more and 110° C. or less.

8. The method of claim 1, wherein the continuous polymerizing is performed for 1 hour or more and 2 hours or less.

9. The method of claim 1, further comprising maintaining an internal pressure of the reacting part at 5 bar or less during the continuous polymerization.

10. The method of claim 1, wherein a conversion rate of the low molecular weight acrylic resin measured according to the following General Equation 1 is 70% or more and 99% or less:

$$C = B/A \times 100\% \quad \text{[General Equation 1]}$$

wherein, A means a weight (g) of the low molecular weight acrylic resin, B means a weight (g) of a dried low molecular weight acrylic resin, and C means a conversion rate (%).

11. The method of claim 9, wherein the internal pressure of the reacting part is 1 bar to 5 bar.

* * * * *